3,172,882
POLYMERIZATION CATALYST COMPRISING A CrF₃ IMPREGNATED SUPPORT AND PROCESS OF POLYMERIZING OLEFINS THEREWITH

Donald R. Witt, Bartlesville, Okla., assignor to Phillips Petroleum Company, a corporation of Delaware
No Drawing. Filed May 7, 1962, Ser. No. 193,016
8 Claims. (Cl. 260—94.9)

This invention relates to a catalyst for the polymerization of olefins and a method for the preparation of such a catalyst. In one aspect, this invention relates to a method of preparing a catalyst which is particularly suitable for use in the polymerization of ethylene to normally solid polymer. In another aspect, this invention relates to the preparation of a catalyst containing hexavalent chromium.

Solid polymers of 1-olefins, especially ethylene, have gained considerable commercial importance and have wide utility in the fields of packaging, protective covering and molded articles. Films, sheets, containers and the like, which are highly impermeable to moisture, can be readily prepared from solid polymers of ethylene.

I have discovered an improved process of making solid 1-olefin polymers, especially ethylene polymers, particularly polyethylene, and a unique method of preparing a chromium oxide catalyst by depositing a chromium fluoride on a silica-alumina support, and activating the resulting composite by heating at an elevated temperature and for a sufficient time to impart, to the resulting mixture, increased catalytic activity for promoting the formation of normally solid polymers of olefins, the resulting catalyst containing at least a part of the chromium in the hexavalent state. When ethylene is contacted under polymerization conditions with a catalyst prepared by the method of this invention, an increased yield of solid polymer results.

Accordingly, an object of this invention is to provide an improved method for preparing solid polymers of 1-olefins.

Another object of this invention is to provide a chromium oxide-containing catalyst which can be used to polymerize ethylene to a normally solid polymer in high yields.

Another object of this invention is to increase the polymerization activity and polymer productivity of a chromium oxide-containing polymerization catalyst.

Still another object of this invention is to provide an improved process for the production of solid 1-olefin polymers, especially polymers of ethylene.

Still another object of my invention is to provide a method by which such a catalyst can be prepared.

Other objects, features and advantages of this invention will be apparent to those skilled in the art from the following discussion and the appended claims.

The catalyst of this invention is prepared by admixing a silica-alumina support with a chromium fluoride compound, e.g., chromic fluoride, chromous fluoride, and the like, and activating in an oxidizing atmosphere at a temperature of approximately 450 to 1500° F. for a time generally ranging from 5 minutes to 20 hours or longer, preferably from 30 minutes to about 10 hours, so that the chromium fluoride is converted to chromium oxide in which the chromium is at least partially in hexavalent state at the termination of the heating. While the term "support" is used to designate the silica-alumina portion of the catalyst of the invention, it is not meant to infer that this portion is inert since the activity of the total catalyst is affected by the nature and the composition of the support. The amount of silica in the silica-alumina portion can range from 5 to 99 weight percent but is preferably in the range of about 80 to 95 weight percent and from 5 to 20 weight percent alumina. The silica-alumina portion is preferably a porous material, e.g. a gel suitable for impregnation. Commercially available cracking catalysts containing silica-alumina in the prescribed ratios are quite suitable.

The catalyst, according to the invention, can be prepared by preparation methods known in the art, e.g. direct mixing of solid components, impregnation, etc. The support is preferably impregnated with a chromium fluoride compound in an aqueous solution in sufficient concentration to produce a finished catalyst having from 0.5 to 30 weight percent chromium based on the total weight of the catalyst, preferably from about 1 to 10 weight percent, but amounts outside these ranges can be employed, if desired. For maximum activity, it is most preferred that the chromium content of the catalyst be in the range of from 1 to 5 weight percent. The silica-alumina is mixed with the aqueous solution of chromium fluoride for a sufficient length of time to allow thorough impregnation. The excess solution is then removed and the catalyst is dried.

The impregnated catalyst is activated by heating at an elevated temperature for a sufficient length of time to increase the activity of the catalyst. This activation is effected in an oxidizing atmosphere at calcining temperatures of at least about 350° F. and not substantially greater than about 1500° F. As a practical matter, a catalyst prepared by dry mixing is ordinarily activated at a temperature ranging from 350–1500° F. and a catalyst prepared by impregnation is ordinarily activated at a temperature ranging from about 450–1500° F., preferably 750 to 1500° F. The time of activation can vary over a broad range depending upon the temperature employed. Generally, the period of activation ranges from about 5 minutes to 20 hours or longer, preferably from 30 minutes to about 10 hours. It is ordinarily preferred that the heating be conducted in the presence of an oxygen-containing gas such as air, which is preferably substantially free of water, for example, having a dew point below 75° F., and preferably below 0° F. The finished catalyst contains a substantial portion of the chromium in hexavalent form, preferably at least 0.1 weight percent based on the total catalyst of chromium being in the hexavalent state.

The polymerization reaction of the invention can be carried out by contacting monomer(s) with the catalyst prepared as described above, under polymerization conditions. The process can be conducted in either the gas phase or liquid phase using a diluent and with a catalyst in a fixed bed, moving bed, fluidized bed or as a slurry in the diluent. The temperature of the polymerization is broadly within the range of about 100 to about 500° F., but the preferred range is at least 150° F. and generally does not exceed 450° F. The pressure can vary from atmospheric for vapor phase reactions to 700 p.s.i. or higher if desired. When a diluent is employed, the pressure is sufficient to maintain the diluent in the liquid phase and to dissolve sufficient monomer in the diluent. Generally the pressure of the reaction is at least 100 to 300 p.s.i. and is not over 500 p.s.i. in most cases.

A liquid phase process is preferred in which a hydrocarbon diluent which is liquid, inert, and non-deleterious under the reaction conditions is employed. Paraffinic and naphthenic hydrocarbons having from 3 to 12, preferably 5 to 12, carbon atoms per molecule can be utilized. Examples of such diluents are propane, isobutane, isooctanes, cyclohexane, methylcyclohexane and the like. The feed rate can range from 0.1 to 20 liquid hourly space velocity with a preferred range from 1 to 6 liquid hourly space velocity in a liquid phase process with a fixed bed catalyst. In a liquid phase process in which the catalyst is present as a slurry in the diluent, the amount of catalyst based on the diluent is in the range of 0.01 to 10 weight percent. In a moving bed process, the feed rate is about 2 to 6 v./v./hr. with a monomer concentration in the range of 0.1 to 25 weight percent and the catalyst rate from 0.1 to 0.5 v./v./hr.

In accordance with the present invention, 1-olefins having from 2–12 carbon atoms, especially ethylene, can be polymerized to obtain increased yields of solid polymer by the use of a catalyst prepared in accordance with the invention as described hereinbefore. The polymerization includes homopolymerization of these 1-olefins as well as copolymerization of these 1-olefins with each other and diolefins such as butadiene, isoprene and the like. The polymerization preferably includes ethylene homopolymerization and copolymerization of ethylene with at least one olefin having a higher molecular weight, especially aliphatic olefins having from 3 to 12 carbon atoms per molecule, for example, propylene, 1-butene, 2-butene, 1-pentene, 1-hexene, 4-methyl-1-pentene, 1-octene, 1-dodecene, butadiene, isoprene, and the like. Frequently, the higher olefin is utilized in minor amounts as compared with ethylene and usually does not exceed about 25 weight percent of the total monomeric feed mixture. Polymers that can be prepared according to the invention include polyethylene, polypropylene, ethylene-propylene copolymers, ethylene-butene-1 copolymers, ethylene-pentene-1 copolymers, propylene-butene-1 copolymers, and the like.

When the reaction is conducted at temperatures of approximately 225° F. and below so that homopolymer or copolymer which forms is in the form of a solid granular suspension in the reaction mixture, the polymer can be recovered by withdrawing reaction mixture from the reactor, removing supernatant liquid by decantation, filtration and/or vaporization and recovering the polymer thus freed from diluent. When the reaction is conducted at temperatures above about 225° F., the polymer is at least partially in solution in the diluent. Under these conditions, the reaction mixture can be withdrawn from the reactor, unreacted olefin removed, for example, by flashing, the catalyst removed by filtration or centrifugation and the polymer recovered from solution in the diluent by cooling to precipitate the polymer and subsequently filtering or by vaporizing the diluent. Other reaction techniques and recovery methods known to those skilled in the art are applicable in the practice of the present invention.

A better understanding of the invention will be obtained upon reference to the following illustrative examples which are not intended, however, to be unduly limitative of the invention.

EXAMPLE I

A 20 g. quantity of a commercial catalytic grade 87:13 silica-alumina (surface area about 540 m.²/g., pore diameter about 65 A., particle size about 100–300 U.S. mesh, about 15% moisture by weight) was stirred into 36 cc. of distilled water containing sufficient purified grade $CrF_3 \cdot 9H_2O$ (about 2.25 g.) to yield a solid which after evaporation would contain about 2.5% chromium (as Cr.). When the suspension appeared homogeneous, the slurry was evaporated in an evaporating dish placed on a hot plate until the solids gave the appearance of dryness. The solid catalytic material was then heated in the presence of air at 1000° F. for 5 hours. It was then stored under nitrogen until used. Analysis of the catalyst showed a chromium content of 2.5% (as Cr).

A 0.035 g. quantity of the catalyst prepared above was charged into a 1-liter, agitated, stainless steel reactor (previously purged with nitrogen) together with 340 g. dry cyclohexane. The temperature of the system was elevated to about 281° F. at which time ethylene was introduced into the reactor, attaining about 450 p.s.i.g. in about 3 minutes. The reaction was then allowed to proceed at 288–290° F. for 1 hour at that pressure which was maintained by a demand flow of ethylene. At the end of the reaction period, the vessel was opened and most of the volatiles were allowed to flash evaporate. The slightly wet solid polymer was then sprayed with a small quantity of antioxidant (Ionol [1]), ground to a granular state, and then dried completely for 0.5 hour at 212° F. under reduced pressure. A 105.16 g. quantity of solid polyethylene was recovered.

The essential data from this run (Run 1) and a number of others identically carried out except that other forms of chromium were used are described in Table I. The catalyst preparations were carried out essentially as that described above.

ETHYLENE POLYMERIZATION OVER CHROMIUM OXIDE CATALYSTS 2.5% Cr in Catalyst
Catalyst activation: 5 hr. at 1000° F.
Reaction in 1 liter stainless steel reactor
Catalyst base: variable
Reaction temperature: 285±5° F.
Reaction pressure: 450 p.s.i.g.
Reaction time: 1 hour
Diluent: 340 g. cyclohexane

| Run No. | Chromium Form Used | G. Cat. Used in Run—87:13 Silica-Alumina Catalyst Base | Productivity, g./g. | Melt Index [1] IX |
|---|---|---|---|---|
| 1 | $CrF_3$ | 0.035 | 3,000 | 1.44 |
| 2 | $CrCl_3$ | 0.034 | 1,943 | 1.11 |
| 3 | $CrBr_3$ | 0.052 | 1,400 | 0.90 |
| 4 | $CrO_3$ | 0.043 | 1,400 | 0.75 |

[1] ASTM D–1238–57T—Procedure E.

It is seen from the table that the use of chromium fluoride with a silica-alumina base results in an improvement in polymer productivity. This productivity is greater than that resulting from the use of either chromium chloride and chromium bromide, indicating that not all halogen compounds are equivalent in this respect. The chromium fluoride is even more effective than the oxide.

As will be evident to those skilled in the art, various modifications of this invention can be made, or followed, in the light of this foregoing disclosure and discussion, without departing from the spirit or scope thereof.

I claim:

1. A process for preparing an improved polymerization catalyst which comprises depositing a chromium fluoride compound on a silica-alumina support, and activating the composite by heating in an oxygen-containing atmosphere at an elevated temperature and for a period of time sufficient to impart, to the resulting mixture, increased catalytic activity for promoting the formation of normally solid polymers of olefins, the resulting catalyst containing at least part of the chromium in the hexavalent state.

2. A polymerization catalyst produced according to claim 1.

3. A process for preparing an improved polymerization catalyst which comprises impregnating a silica-alumina support with a solution of a chromium fluoride compound in an amount sufficient to provide an impregnated catalyst having from 1–10 weight percent chromium based on the total composite, and heating the composite in an oxygen-containing atmosphere at a temperature above about 450° F. for a period of time sufficient to activate said catalyst and leave at least part of the chromium in the hexavalent state.

4. A process of preparing a catalyst useful in the polymerization of ethylene to a normally solid polymer which comprises mixing a porous silica-alumina support containing from 5–99 weight percent silica and from 1–95 weight percent alumina with an aqueous solution of a chromium fluoride in sufficient concentration to provide an impregnated catalyst having from 1 to 10 weight percent chromium based on the total catalyst weight, drying the thus treated support and thereby forming a catalyst

[1] 2,6-di-tert-butyl-4-methylphenol.

impregnated with said chromium fluoride, and heating the thus impregnated catalyst in an oxygen-containing atmosphere at a temperature in the range 450–1500° F. for a period of time ranging from 5 minutes to 20 hours so as to leave a catalyst having at least a portion of the chromium in the hexavalent state.

5. A process according to claim 4 wherein said silica-alumina support contains from 80 to 95 weight percent silica and from 5 to 20 weight percent alumina and the finished catalyst contains from 1 to 5 weight percent chromium as the oxide and wherein said heating is effected with air at a temperature ranging from 750 to 1500° F. for a period of time ranging from about 30 minutes to about 10 hours.

6. A polymerization process which comprises polymerizing monomers selected from ethylene and mixtures of ethylene with higher molecular weight olefins under polymerization conditions of temperature and pressure in the presence of a catalyst comprising chromium oxide supported on silica-alumina and wherein at least a portion of the chromium is hexavalent, said catalyst having been prepared by depositing chromium fluoride on silica-alumina and heating at an elevated temperature for a period of time sufficient to activate said catalyst for said polymerization and leave at least a part of the chromium in the hexavalent state.

7. The process of claim 6 wherein said support contains 5–99 weight percent silica and 95–1 weight percent alumina, 1–10 weight percent chromium based on total catalyst and wherein said heating is carried out at a temperature in the range 450–1500° F.

8. The polymerization process which comprises polymerizing ethylene to a solid polymer at a temperature in the range of 150–350° F. in the presence of a catalyst prepared by depositing chromium fluoride on a silica-alumina support containing from 80–95 weight percent silica and 5–20 weight percent alumina in an amount sufficient to provide a final composite containing 1–5 weight percent chromium, heating the resulting mixture in the range 750–1500° F. for a period of time sufficient to activate said catalyst and form a substantial portion of hexavalent chromium in the composite, and recovering a solid polymer of ethylene.

No references cited.